United States Patent [19]

Noda et al.

[11] 4,329,370

[45] May 11, 1982

[54] PROCESS FOR PRODUCING SOLID KOJI

[75] Inventors: Fumio Noda, Kamagaya; Kazuya Hayashi, Kashiwa; Keitaro Mogi, Noda; Takashi Iwaasa, Noda; Takeji Mizunuma, Noda; Toshio Sakasai, Noda, all of Japan

[73] Assignee: Kikkoman Shoyu Co. Ltd., Chiba, Japan

[21] Appl. No.: 155,166

[22] Filed: Jun. 2, 1980

[30] Foreign Application Priority Data

Jun. 6, 1979 [JP] Japan ................................. 54-69974

[51] Int. Cl.$^3$ ............................................... A23L 1/20
[52] U.S. Cl. ...................................... 426/46; 426/52; 426/60
[58] Field of Search ...................... 426/44, 31, 52, 46, 426/60, 7, 532, 589, 465

[56] References Cited

U.S. PATENT DOCUMENTS

| | | | |
|---|---|---|---|
| 3,830,939 | 8/1974 | Sakasai et al. | 426/46 |
| 3,937,844 | 2/1976 | Koyama | 426/46 |
| 4,028,470 | 6/1977 | Hayashi et al. | 426/44 |
| 4,046,921 | 9/1977 | Akao et al. | 426/52 |
| 4,048,340 | 9/1977 | Izumi | 426/52 |
| 4,115,591 | 9/1978 | Noda et al. | 426/52 |
| 4,117,169 | 9/1978 | Noda et al. | 426/52 |

FOREIGN PATENT DOCUMENTS 43-13675 6/1968 Japan .

*Primary Examiner*—Norman Yudkoff
*Attorney, Agent, or Firm*—Sherman & Shalloway

[57] ABSTRACT

In a process for producing a solid koji for a fermented food product which comprises inoculating a koji mold in a modified koji substrate and cultivating it at a temperature of about 20° C. to about 40° C. for a time sufficient to produce a solid koji for fermented food products, the improvement wherein at a certain time during a period of about 10 hours to about 20 hours after the inoculation of the koji mold, the cultivation system is subjected to a drying treatment to adjust its water content to about 30±5%.

8 Claims, No Drawings

PROCESS FOR PRODUCING SOLID KOJI

This invention relates to a process for producing a solid koji which is suitable for use in the manufacture of fermented food products such as soy sauce, miso, sake (Japanese wine from rice) and mirin, and particularly, to an improved process for producing a solid koji, which makes it possible to inhibit growth of contaminating bacteria that adversely affect the quality of koji, and to increase accumulation of enzymes, such as protease and amylase, useful for manufacture of fermented food products.

More specifically, the present invention pertains, in a process for producing a solid koji for fermented food products which comprises inoculating a koji mold in a modified koji substrate and cultivating it at a temperature of about 20° C. to about 40° C. for a time sufficient to produce a solid koji for fermented food products, to the improvement wherein at a certain time during the period of about 10 hours to about 20 hours after the inoculation of the koji mold, the cultivation system is subjected to a drying treatment to adjust its water content to about 30±5%.

According to the conventional practice, koji for fermented food products is produced by inoculating a koji mold or a koji mold in the form of a seed starter in a modified koji substrate, and cultivating it in a microbiologically open system. Hence, there is a fairly high degree of possibility that contaminating bacteria which adversely affect the quality of the koji product will grow and contaminate the cultivation system. Furthermore, modified koji substrates modified by steaming or other known means and/or heat-sterilized, preferably those derived from naturally occurring vegetable or fish proteinous materials and naturally occurring vegetable carbohydrate materials such as soybean, fish meal, wheat, and rice assume a condition in which various contaminating bacteria grow easily. It has been desired therefore to develop an improved method which can more effectively inhibit growth of contaminating bacteria and increase accumulation of enzymes useful for manufacture of fermented food products in the production of koji for fermented food products.

The present inventors have made investigations in order to develop a method which meets such a desire. Consequently, it has been found in accordance with this invention that by subjecting the cultivation system to a drying treatment to adjust its water content to a specified range at a certain time during a specified period of time after inoculation of a koji mold in a koji substrate, preferably by performing the drying treatment while an aliphatic carboxylic acid containing up to 4 carbon atoms or an alkali metal salt thereof and/or an additive selected from the group consisting of chlorous acid, hypochlorous acid, sulfurous acid, hyposulfurous acid, hydrogensulfurous acid, metabisulfurous acid, hydrogen peroxide and bleaching powder is incorporated in the substrate, growth of contaminating bacteria can be effectively inhibited and accumulation of enzymes useful for manufacture of fermented food products increases to give a high quality solid koji for fermented food products.

Specifically, the investigations of the present inventors have shown that the aforesaid improvement can be achieved by inoculating a koji mold in a koji substrate, and at a certain time during a period of about 10 to about 20 hours after the inoculation, subjecting the cultivation system to a drying treatment to adjust its water content to about 30±5% by weight, particularly about 30±3% by weight.

It was previously known that in the production of koji for soy sauce, in order to increase the content of free glutamic acid in a moromi liquid made by using the aforesaid koji, a step is provided of drying the cultivation system for a short period at a time immediately after germination of the spores of the koji mold when heat from growth of the koji mold has not yet been generated (see Japanese Patent Publication No. 13675/68 published June 10, 1968). This Patent Publication, however, lacks any recognition about the inhibition of contaminating bacteria which adversely affect the quality of koji. The Publication discloses that drying treatment is carried out during a period of 12 to 16 hours after the inoculation of a koji mold to adjust the water content of the cultivation system to 39.5 to 42.0% by weight, and that by producing soy sauce using this koji, the free glutamic acid contents of soy sauce increased by 7 to 14% over a control.

As shown in Table 1 below, the investigations of the present inventors have shown that by performing the cultivation such that the cultivation system is subjected to a drying treatment to adjust its water content to about 30±5% by weight, particularly about 30±3% by weight, at a time during the specified period after inoculation of a koji mold, the number of contaminating bacteria can be reduced to the order of $10^5$ to $10^6$ and the specific protease and amylase activities increase by about 20 to 35% as compared with the results in a control in which the cultivation was performed such that the cultivation system has a water content of about 40% by weight (40.2%) and in which the number of contaminating bacteria was on the order of $10^8$. This improving effect is quite unexpected. Furthermore, it has been found surprisingly that according to a preferred embodiment in which the aforesaid drying treatment is performed using a substrate containing the aforesaid carboxylic acid or its salt or the additive, the number of contaminating bacteria further decreases markedly to the order of $10^1$ to $10^3$ and the specific protease and amylase activities increase by 20 to 70% as compared with a control, as shown in Table 3 below.

It is an object of this invention therefore to provide a markedly improved process for producing a solid koji for fermented food products.

The above and other objects and advantages of this invention will become more apparent from the following description.

According to the process of this invention, a koji mold or a koji mold in the form of a seed starter is inoculated in a modified koji substrate, and then cultivated. During the step of cultivation, the cultivation system is subjected to a drying treatment to adjust its water content to about 30±5% by weight. The drying treatment can be performed at a certain time during a period of about 10 to about 20 hours after the inoculation.

Generally, the modified koji substrate has a water content of about 40 to about 50% by weight. During the cultivation, it is subjected to a drying treatment so that its water content is reduced to about 30±5% by weight, preferably about 30±3%. The time from the inoculation to the end of the cultivation is generally about 25 to about 300 hours, most usually about 30 to about 100 hours. According to the process of this invention, the drying treatment is performed within a period of about 10 to about 20 hours after the inoculation.

The drying treatment may be carried out by any known means. For example, the water content of the cultivation system can be reduced by passing dry air through the cultivation zone; or passing heated air through the cultivation zone; or passing dried and heated air through the cultivation zone. Or drying may be carried out under reduced pressure. Preferably, the drying treatment is completed within as short a period of time as possible. For example, it is preferred to adjust the water content to about 30±5% by weight, preferably about 30±3% by weight, within a period of up to about 2 hours.

The known cultivation conditions and means can be used in the process of this invention except for the inclusion of the aforesaid drying step. Preferably, the cultivation is carried out at a temperature of about 20° to about 40° C. The pH of the cultivation system can be varied suitably, but generally it is about 4 to about 7.5.

The modified koji substrates and methods for preparation thereof in this invention are also known. For example, an unmodified koji substrate composed of a material preferably selected from the group consisting of vegetable carbohydrate materials, vegetable proteinous materials, fish proteins and the like is modified by conventional modifying means. These modifying means include, for example, a method of steaming treatment in which water is added to the unmodified koji substrate or raw materials therefor, and it is heated with saturated steam at atmospheric or elevated pressure and then cooled spontaneously or rapidly; a method of roasting treatment in which the materials are dry-heated at a high temperature either directly or after adding water at atmospheric or elevated pressures, and the products are cooled; or a method of puffing treatment in which with or without adding water, the materials are heat-treated with saturated steam or superheated steam at high temperatures, and the product is then rapidly released into the open atmosphere at a lower pressure.

The proteinous materials and carbohydrate materials used as the unmodified koji substrate include, for example, proteinous materials such as soybean, defatted soybean, dehulled soybean, gluten, fish meal and microbial proteins; carbohydrate materials such as wheat, wheat bran, rice, barley, oats and corn; and by-products of fermented food products such as soy sauce lees, mirin lees and sake lees. These by-products can be used without modification because they are already in the modified state.

The koji molds used in the process of this invention are known, and include, for example, known molds *Aspergillus oryzae* (ATCC 20386, ATCC 11866, ATCC 14895, and IFO 5238), *Aspergillus phoenicis* (ATCC 14332), *Aspergillus niger* (ATCC 1004), *Aspergillus awamori* (ATCC 14331, ATCC 14333, ATCC 14335), *Rhizopus oryzae* (ATCC 4858, HUT 1270), *Rhizopus oligosporus* (ATCC 22959), *Rhizopus japonicus* (ATCC 8466), *Rhizopus formosaensis* (IAM 6245), *Mucor circinelloides* (ATCC 8770), *Penicillium glaucum* (AHU 8026), and *Penicillium fuscum* (ATCC 10447).

These koji molds can be freely obtained from the aforesaid microorganism depositories, namely ATCC (The American Type Culture Collection, U.S.A.), IFO (Institute for Fermentation, Osaka, Japan), HUT (Hiroshima University, Faculty of Engineering, Hiroshima, Japan), IAM (Institute of Applied Microbiology, University of Tokyo, Japan), and AHU (Faculty of Agriculture, Hokkaido University, Sapporo, Japan).

According to one preferred embodiment of the process of this invention, an aliphatic carboxylic acid containing up to 4 carbon atoms or an alkali metal salt thereof may be included in the modified koji substrate before the drying step mentioned above, for example during or before the inoculation of the koji mold, by using known means such as those described in U.S. Pat. Nos. 4,028,470 and 4,115,591. Similarly, in place of, or together with, the aforesaid aliphatic carboxylic acid, at least one additive selected from the group consisting of chlorous acid, hypochlorous acid, sulfurous acid, hyposulfurous acid, hydrogensulfurous acid, metabisulfurous acid, hydrogen peroxide and bleaching powder may be incorporated into the modified koji substrate.

Examples of the aliphatic carboxylic acid and its salts used in the preferred embodiment mentioned above are formic acid, acetic acid, propionic acid and butyric acid, and sodium and potassium salts thereof. Of these, acetic acid, propionic acid and sodium and potassium salts thereof are preferred.

These additives may be incorporated directly to the substrate or raw materials therefor, or may be diluted with powdery diluents such as wheat flour or rice flour or water before addition.

The amounts of these additives may be chosen properly. For example, the amount of the aliphatic carboxylic acid or its salt may be about 0.01 to about 2% by weight, and the amount of the aforesaid additive selected from the group consisting of chlorous acid, hypochlorous acid, sulfurous acid, etc. may be about 0.01 to about 2% by weight. When both of these additives are used together, their total amount is preferably up to about 2% by weight.

The additives used in this invention are mostly or completely assimmilated by koji molds, yeasts and a small number of bacteria. Even if they remain in koji, they will be completely assimilated in a step of fermentation and aging after charging, and therefore, no problem arises with respect to the taste and sanitation of the final product.

The following examples illustrate the process of this invention in more detail.

EXAMPLE 1

One hundred and fifty liters of hot water at 80° C. was added to 110 kg of defatted soybeans, and the mixture was steamed with saturated steam under a pressure of 2 kg/cm$^2$.G for 10 minutes. Roasted and crushed wheat obtained by roasting 110 kg of wheat at 180° C. for 40 seconds and then crushing it was mixed with the steamed defatted soybeans to prepare a koji-making substrate having a water content of 45.0%, w/w.

Ten grams of a seed koji mold (the number of available spores: $1 \times 10^9$/g), *Aspergillus oryzae* (ATCC 14895), was inoculated in each of seven lots of the resulting modified koji-making substrate, and 3 ml of a suspension of various contaminating bacteria separated from an ordinary soy sauce koji (the number of living cells: $1 \times 10^9$/g) was sprayed uniformly on the modified koji substrate. Each lot was placed in a tray and set in a koji-making incubator at 30° C. and a definite humidity.

Lot No. 1 (control) was subjected to a usual control of koji making for 42 hours. Lots Nos. 2 to 6 were each placed in a separately provided air circulating-type drying chamber to adjust its water content to each of the values shown in Table 1 (the drying time: 15 to 60 minutes) after a lapse of 15 hours from the inoculation of the koji mold. Then, the test lot was returned to the koji-making incubator, and koji making was performed for a total time of 42 hours.

The water content of koji after the end of koji making decreased by about 5 to 6% (w/w) as compared with that after the drying treatment.

The number of contaminating bacteria in the resulting koji and the specific activities of protease and amylase were measured, and the results are shown in Table 1.

A 100-liter tank was charged with 33 kg of the resulting koji and 40 liters of a 22% (w/w) aqueous solution of sodium chloride, and they were subjected to a control of moromi production in a customary manner. The resulting soy sauce moromi was squeezed to obtain a moromi liquid. The moromi liquid was analyzed for composition, and also subjected to an organoleptic test.

The water content and the number of bacteria in the modified koji substrate, the cultivation system and the resulting koji, the specific activities of protease and amylase, and the components and organoleptic properties of a moromi liquid were determined by the following methods.

Water content

A sample (20 g) was placed on a dish of a Kett infrared ray water content meter (manufactured and solid by Kett Kagaku Kenkyusho Kabushiki Kaisha), and heated for 30 minutes. The difference between the weight of the sample before heating and that after heating was measured, and the water content of the sample was calculated.

Number of bacteria

One gram of a sample koji was suspended in 100 ml of aseptic physiological saline, and if desired, the suspension was sequentially diluted. One milliliter of the dilution was added to 7 ml of a culture medium of the following composition, and was incubated at 37° C. for 24 hours. The number of bacterial colonies which consequently appeared was measured.

Composition of the culture medium:
Meat extract—1% (w/v)
Polypeptone—1% (w/v)
Yeast extract—0.5% (w/v)
Glucose—1% (w/v)
Agar—1.5 (w/v)
pH—7.0

Specific activities of protease and amylase

Ten grams of a koji sample was mixed with 100 ml of distilled water, and the mixture was allowed to stand for 24 hours at 5° C. The mixture was then filtered, and the filtrate was used as an enzyme solution. The protease and amylase activities of this solution were determined by the method described in the Japanese-language publication "Science of Seasoning," Vol. 22, No. 3, page 14 (1975) published by Japanese Soy Sauce Institute.

The activities obtained were converted to the ratios of these to the activities of the koji in Lot No. 1 (control) by taking the latter as 1.

Analysis of the components of moromi liquid

A sample of moromi liquid was analyzed by the method described in the Japanese-language publication "Analysis Methods in Fermentation" (by Shoichi Yamada, published by Sankyo Tosho Kabushiki Kaisha). In the following tables, NaCl, T.N., Glu.A., R.S., and Alc. stand respectively for sodium chloride, total nitrogen, glutamic acid, reducing sugars, and ethyl alcohol. T.N.-U.R. shows the percentage of dissolved nitrogen based on total nitrogen in the koji-making substrate.

Organoleptic test on moromi liquid

The taste of each of the moromi liquids in lots Nos. 2 to 7 was compared with that of the moromi liquid in lot No. 1 (control). The results were rated on a scale of 0 (no difference), 1 (some difference), 2 (large difference), and 3 (very large difference). Where the moromi had a better flavor than the moromi of lot No. 1 (control), the sign (+) was attached. The sign (−) thus shows that the flavor of the moromi was inferior to that of the moromi in lot No. 1 (control). These ratings were averages of the results obtained by a panel of 20 well-trained specialists having a differentiating ability. The sign (*) in the column of "Value" shows that the difference was significant at 5% level; the sign (**) shows that the difference was significant at 1% level; and the sign (−) shows that the difference was not significant.

TABLE 1

| Test | | Comparison 1 (control) | Comparison 2 | Invention 3 | Invention 4 | Invention 5 | Invention 6 | Comparison 7 |
|---|---|---|---|---|---|---|---|---|
| Water content of solid koji after the drying treatment (%) | | 40.2 | 37.1 | 34.0 | 33.1 | 30.0 | 27.2 | 23.0 |
| Number of bacteria in koji per gram | | $3.8 \times 10^8$ | $1.1 \times 10^8$ | $8.8 \times 10^5$ | $4.1 \times 10^5$ | $2.6 \times 10^5$ | $1.3 \times 10^5$ | $1.0 \times 10^5$ |
| Specific enzyme activity in koji | Protease | 1.00 | 1.09 | 1.27 | 1.29 | 1.35 | 1.28 | 0.88 |
| | Amylase | 1.0 | 1.1 | 1.2 | 1.2 | 1.3 | 1.2 | 0.9 |
| Analysis of the components of moromi liquid (%) | NaCl | 17.40 | 17.40 | 17.35 | 17.30 | 17.30 | 17.35 | 17.45 |
| | T.N. | 1.73 | 1.74 | 1.75 | 1.75 | 1.78 | 1.77 | 1.70 |
| | Glu. A. | 1.25 | 1.26 | 1.31 | 1.31 | 1.33 | 1.31 | 1.19 |
| | R.S. | 2.85 | 3.05 | 3.00 | 3.05 | 3.25 | 3.10 | 2.55 |
| | Alc. | 2.25 | 2.20 | 2.20 | 2.20 | 2.15 | 2.20 | 2.05 |
| | T.N.-U.R. | 84.1 | 84.6 | 85.4 | 85.6 | 86.6 | 86.3 | 82.9 |
| Organoleptic test | Rating | 0 | +0.2 | +0.6 | +0.6 | +0.7 | +0.6 | −0.5 |
| | Value | — | — | * | * | * | * | * |

The results in Table 1 show that by reducing the water content of the solid koji to 35% (w/w) or less, especially 33% (w/w) or less, the number of bacteria decreases markedly as compared with the control, and at the same time, the activites of enzymes such as protease and amylase can be markedly increased, and that when soy sauce is produced by using these kojis in accordance with this invention, the ratio of utilization of nitrogen and the contents of useful components such as glutamic acid and sugars increase, and the resulting soy sauce is organoleptically excellent.

When the water content of koji after drying was reduced to less than about 25% (w/w), growth of the koji mold was inhibited, and accumulation of enzymes decreased. Accordingly, drying to such a low water content should desirably be avoided.

EXAMPLE 2

One hundred kilograms of polished rice with a degree of polishing of 10% was washed, soaked and freed of water in a customary manner. It was steamed with saturated steam for 10 minutes under a pressure of 2 kg/cm$^2$.G, and allowed to cool to make a koji substrate.

Ten grams of a seed koji mold (the number of available spores: $1 \times 10^9$/ml), Aspergillus oryzae (ATCC 11866), was inoculated in each of test lots containing 30 kg of the resulting koji substrate (water content: 42.5% w/w), and 1 ml of a suspension of various bacteria separated from an ordinary rice koji (the number of living cells: $1 \times 10^9$/ml) was sprayed uniformly on the koji substrate. Each lot was placed in a koji-making tray, and set in a koji-making incubator kept at 30° C. and a definite humidity.

Lot No. 1 (control) was subjected to an ordinary control of Koji making for 48 hours. Test lots Nos. 2 to 6 were dried for 20 minutes in a separately provided air circulating-type drying chamber after a lapse of 8, 10, 15, 20 and 22 hours, respectively, from the inoculation of the koji mold to reduce the water content to 32 to 34% (w/w). Then, each of the lots was returned to the koji-making incubator at 30° C., and subjected to koji making for a total time of 48 hours.

The number of bacteria, and the specific activities of protease and amylase were measured, and the results are shown in Table 2.

A 100-liter tank was charged with 40 kg of soybeans steamed in a customary manner, 9 kg of common salt and 10 kg of the koji obtained in each run. They were subjected to fermentation and aging in a customary manner to obtain a miso moromi liquid. The resulting moromi liquid was analyzed for components, and the results are shown in Table 2.

T.N. (water-soluble) shown in Table 2 was measured as follows: The miso was homogenized, and 1 g of the homogenized miso was suspended in 100 ml of water. The suspension was filtered, and the total amount of nitrogen in the filtrate was measured by the Kjeldahl's method.

and that when miso is produced by using these kojis, the contents of useful components such as sugars and water-soluble nitrogen increase and the resulting miso is of good quality.

EXAMPLE 3

To 10 kg of defatted soybeans in each test lot was added 13 liters of an aqueous solution of each of the various additives shown in Table 3 in hot water at 80° C. (in each test lot, the amount of the additive was adjusted to 0.5% w/w based on the total amount of the koji substrate). The mixture was steamed with heated saturated steam under a pressure of 2 kg/cm$^2$.G for 10 minutes. The treated mixture was then mixed with roasted and crushed wheat obtained by roasting 10 kg of wheat at 180° C. for 40 seconds and then crushing it to prepare a koji-making substrate (water content 44.5% w/w).

Fifty grams of a seed koji mold (the number of available spores: $1 \times 10^9$/ml), Aspergillus oryzae (ATCC 20386), was inoculated in 28 kg of the modified koji mold, and 3 ml of a suspension (the number of living cells: $1 \times 10^9$/g) of various bacteria separated from an ordinary soy sauce koji was uniformly sprayed onto the substrate. Each test lot was placed in a koji-making tray, and set in a koji-making incubator kept at 30° C. and a definite humidity.

Each of the lots was dried for 20 minutes in a separately provided air circulating-type drying chamber after a lapse of 15 hours from the inoculation of the koji mold to a water content of 32 to 34% (w/w), and then returned to the koji-making incubator. Koji-making was thus performed for a total time of 42 hours.

The number of bacteria and the protease and amylase activities of the resulting koji were determined, and the results are shown in Table 3.

Test lot No. 1 (control) was treated in the same way as above except that no additive was added to the koji-making material but only hot water at 80° C. was added, and during the koji-making process, the drying treatment was not performed.

Twenty kilograms of the koji in each of the lots, and 30 liters of a 22% (w/w) aqueous solution of sodium chloride were charged into a 50-liter tank, and subjected to a usual control of moromi making at 30° C. for 150 days. The resulting soy sauce moromi was squeezed to obtain a moromi liquid. The moromi liquid was analyzed for components and subjected to an organoleptic test. The results are shown in Table 3.

TABLE 2

| Test lot | 1(control) | 2(comparison) | 3 | 4 | 5 | 6(comparison) |
|---|---|---|---|---|---|---|
| Time elapsed until the drying treatment after inoculation (hrs) | — | 8 | 10 | 15 | 20 | 22 |
| Number of bacteria in koji per gram | $3.8 \times 10^7$ | $1.9 \times 10^4$ | $2.2 \times 10^4$ | $3.7 \times 10^4$ | $6.1 \times 10^4$ | $2.5 \times 10^4$ |
| Specific enzyme activities in koji | | | | | | |
| Protease | 1.00 | 0.85 | 1.11 | 1.20 | 1.15 | 0.92 |
| Amylase | 1.0 | 0.6 | 1.1 | 1.2 | 1.1 | 1.0 |
| Analysis of the components of miso (%) | | | | | | |
| NaCl | 10.50 | 10.75 | 10.60 | 10.55 | 10.50 | 10.50 |
| T.N. | 2.20 | 2.18 | 2.20 | 2.18 | 2.18 | 2.15 |
| R.S. | 11.5 | 10.0 | 12.1 | 12.5 | 12.3 | 11.8 |
| T.N. (Water-soluble) | 0.85 | 0.68 | 0.93 | 1.12 | 0.98 | 0.90 |
| $\frac{\text{T.N. (Water-soluble)}}{\text{T.N.}} \times 100$ | 38.6 | 31.2 | 42.3 | 51.4 | 45.0 | 41.9 |

The results in Table 2 show that when the drying treatment is performed during a period of about 10 to about 20 hours after inoculation of a koji mold, the number of bacteria in the koji decreases markedly as compared with the control, and at the same time, the protease and amylase activities can be increased greatly,

TABLE 3

| Test lot | Additive | Number bacteria in koji per gram | Specific enzyme activities Protease | Specific enzyme activities Amylase | Analysis of the components of moromi liquid (%) NaCl | T.N. | Glu. A. | R.S. | Alc. | T.N.-U.R. | Organoleptic test Rating | Organoleptic test Value |
|---|---|---|---|---|---|---|---|---|---|---|---|---|
| 1 (control) | None | $2.1 \times 10^8$ | 1.0 | 1.0 | 17.80 | 1.72 | 1.30 | 4.05 | 1.95 | 83.8 | 0 | — |
| 2 | Acetic acid | $4.5 \times 10^2$ | 1.4 | 1.2 | 17.65 | 1.80 | 1.45 | 3.80 | 2.10 | 88.4 | +1.5 | ** |
| 3 | Sodium acetate | $2.1 \times 10^2$ | 1.6 | 1.5 | 17.55 | 1.80 | 1.47 | 3.95 | 2.15 | 88.9 | +1.7 | ** |
| 4 | Potassium acetate | $3.3 \times 10^2$ | 1.5 | 1.4 | 17.55 | 1.80 | 1.46 | 4.05 | 2.10 | 88.7 | +1.6 | ** |
| 5 | Propionic acid | $1.8 \times 10^2$ | 1.3 | 1.4 | 17.60 | 1.78 | 1.43 | 3.95 | 2.15 | 87.7 | +1.4 | ** |
| 6 | Sodium propionate | $1.3 \times 10^2$ | 1.4 | 1.5 | 17.55 | 1.79 | 1.45 | 4.00 | 2.10 | 88.4 | +1.6 | ** |
| 7 | Sodium formate | $1.1 \times 10^2$ | 1.3 | 1.4 | 17.60 | 1.80 | 1.43 | 3.60 | 2.15 | 88.6 | +1.4 | ** |
| 8 | Sodium butyrate | $5.2 \times 10^2$ | 1.3 | 1.3 | 17.60 | 1.81 | 1.42 | 3.70 | 2.20 | 89.1 | +1.3 | ** |
| 9 | Acetic acid: Sodium acetate (1:1) | $3.0 \times 10^2$ | 1.4 | 1.5 | 17.55 | 1.80 | 1.41 | 3.85 | 2.20 | 88.9 | +1.5 | ** |
| 10 | Chlorous acid | $2.5 \times 10^3$ | 1.2 | 1.3 | 17.60 | 1.76 | 1.40 | 4.50 | 2.10 | 86.7 | +1.2 | ** |
| 11 | Sulfurous acid | $3.1 \times 10^3$ | 1.2 | 1.2 | 17.65 | 1.77 | 1.40 | 4.35 | 2.10 | 86.9 | +1.2 | ** |
| 12 | Hydrogen peroxide | $1.8 \times 10^3$ | 1.2 | 1.2 | 17.65 | 1.78 | 1.39 | 3.80 | 2.15 | 87.4 | +1.3 | ** |
| 13 | Bleaching powder | $2.2 \times 10^2$ | 1.3 | 1.4 | 17.55 | 1.77 | 1.39 | 3.75 | 2.20 | 87.4 | +1.5 | ** |
| 14 | Sulfurous acid: Hydrogen peroxide (1:1) | $2.1 \times 10^2$ | 1.3 | 1.3 | 17.65 | 1.80 | 1.40 | 3.95 | 2.15 | 88.4 | +1.4 | ** |
| 15 | Sodium acetate: Sodium hydrogensulfite (1:1) | $3.0 \times 10^1$ | 1.7 | 1.6 | 17.50 | 1.84 | 1.48 | 3.60 | 2.35 | 90.3 | +2.1 | ** |
| 16 | Potassium acetate: Sodium hyposulfite (1:1) | $5.5 \times 10^1$ | 1.6 | 1.5 | 17.50 | 1.83 | 1.47 | 3.50 | 2.40 | 89.7 | +1.9 | ** |
| 17 | Sodium propionate: potassium hyposulfite (1:1) | $1.9 \times 10^1$ | 1.5 | 1.5 | 17.50 | 1.81 | 1.45 | 3.85 | 2.25 | 89.2 | +1.8 | ** |
| 18 | Acetate acid: bleaching powder (1:1) | $3.1 \times 10^2$ | 1.4 | 1.3 | 17.60 | 1.80 | 1.41 | 4.00 | 2.15 | 88.3 | +1.4 | ** |

The results in Table 3 show that by adding the various additives in accordance with this invention during the inoculation of a koji mold and drying the cultivation system during a period of 10 to 20 hours after the inoculation of the koji mold to reduce the water content of the solid koji to about 30±5% (w/w), the number of bacteria in the koji decreases markedly as compared with the control and the protease and amylase activities can be markedly increased, and that when soy sauce is produced by using these kojis, the ratio of utilization of nitrogen and the contents of useful components such as glutamic acid, sugars and ethyl alcohol increase and the soy sauce obtained was organoleptically excellent.

EXAMPLE 4

Warm water (130 liters) at 60° C. was added to 100 kg of defatted soybeans, and the mixture was steamed with saturated steam at 120° C. under a pressure of 1 kg/cm$^2$.G for 45 minutes. The treated mixture was then mixed with roasted and crushed wheat obtained by roasting 100 kg of wheat at 170° C. for 45 seconds and then crushing it to prepare a koji-making substrate (water content 44.8% w/w).

120 g of a seed koji mold (the number of available spores: $1.2 \times 10^9$/g), Aspergillus oryzae (ATCC 11866), was inoculatted in 150 kg of the koji substrate, and 10 ml of a suspension of various bacteria separated from an ordinary soy sauce koji (the number of living cells: $2 \times 10^8$/g) was sprayed uniformly on the koji substrate. The koji substrate was then placed in an air-circulating mechanical koji-making chamber. After a lapse of 14 hours from the inoculation of the koji mold, the koji was dried for 20 minutes in a separately provided air-circulating drying chamber to a water content of 30% (w/w), and then returned to the aforesaid koji-making chamber. Koji-making was performed for a total period of 45 hours.

The control was performed in the same way as above except that the drying treatment of the koji was not performed. The resulting koji (120 kg) was charged into a 300-liter tank together with 180 liters of a 22% (w/w) aqueous solution of sodium chloride, and fermented and aged at 30° C. for 5 months to form a soy sauce moromi.

The results are shown in Table 4.

TABLE 4

| Sample | Control | Invention |
|---|---|---|
| Water content of koji after drying (%) | 42.5 | 30.0 |
| Number of bacteria in koji per gram | $3.7 \times 10^8$ | $7.5 \times 10^5$ |
| Specific enzyme activities | | |
| Protease | 1.0 | 1.3 |
| Amylase | 1.0 | 1.2 |
| Analysis of the components of moromi liquid (%) | | |
| NaCl | 17.70 | 17.55 |
| T.N. | 1.75 | 1.78 |
| Glu. A. | 1.2 | 1.4 |
| R.S. | 4.10 | 3.80 |
| Alc. | 2.05 | 2.20 |
| T.N.-U.R. | 83.5 | 86.1 |
| Organoleptic test | | |
| Rating | 0 | +2.1 |
| Value | — | ** |

The results in Table 4 show that the koji in accordance with this invention has a far lesser number of bacteria and much higher protease and amylase activities than the koji in the control, and that when soy sauce is produced by using the resulting koji, the product contains large amounts of useful components such as glutamic acid and ethyl alcohol and has a good flavor.

EXAMPLE 5

In each test lot, 13 kg of polished rice with a degree of polishing of 10% was washed, soaked and freed of water in a customary manner, and steamed with saturated steam for 8 minutes under a pressure of 1.5 kg/cm$^2$.G. The resulting koji substrate was sprayed uniformly with 0.5 liter of an aqueous solution of each of the additives shown in Table 5 in hot water at 70° C. (the amount of the additive was adjusted to 0.4% w/w based on the total amount of the koji substrate having a water content of 43.1% w/w in lots Nos. 1 to 3). Then, 20 g of a rice seed koji, *Aspergillus oryzae* (IFO 5238), was uniformly sprayed onto the treated koji substrate. Then, 2 ml of a suspension of various bacteria separated from a rice koji was added. The mixture was placed in a koji-making tray, and then placed in a koji-making incubator kept at 30° and a definite humidity.

After a lapse of 16 hours from the inoculation of the koji mold, the solid koji was dried for 18 minutes in a separately provided air-circulating type drying chamber, and then returned to the koji-making incubator. Thus, koji-making was performed for a total period of 45 hours.

The control was performed in the same way as above except that no additive was incorporated in the koji-making substrate but only hot water at 70° C. was added, and during the koji-making process, the drying treatment was not performed.

Fifteen kilograms of the koji was charged into 200 liter tank together with 100 kg of steamed sticky rice and 50 liters of a 45% (v/v) aqueous solution of ethyl alcohol, and subjected to a control of moromi-making at 25° C. for 60 days in accordance with a usual method of mirin fermentation, and then the product was squeezed. The resulting mirin liquid was analyzed for components and also subjected to an organoleptic test. The results are shown in Table 5.

In Table 5, Baumé and amino acids were measured in accordance with the method described in the above-cited "Analysis Methods in Fermentation" as in the analysis of a soy sauce moromi liquid. The ratio of utilization of sugars was measured as follows: The mirin moromi was homogenized, and a predetermined amount of it was filtered on a filter paper. The sugar content of the filtrate was measured, and the percentage of it based on the total amount of sugars in the moromi was determined.

The results in Table 5 show that the kojis in accordance with this invention have a far lesser amount of bacteria and much higher protease and amylase activities than the koji in the control, and that when mirin is produced using the resulting koji, the product is of excellent quality with a good flavor and large amounts of useful components such as amino acids and sugars.

As demonstrated hereinabove, the process of this invention makes it possible to inhibit markedly growth of contaminating bacteria in solid kojis for production of fermented food products and to increase greatly the amounts of useful enzymes accumulated in the koji, such as protease and amylase. Use of these kojis leads to fermented food products containing large amounts of various useful components and a good flavor.

What we claim is:

1. In a process for producing a solid koji for a fermented food product which comprises inoculating a koji mold in a modified koji substrate having a water content of from about 40% to about 50% by weight and cultivating it at a temperature of about 20° C. to about 40° C. for a time sufficient to produce a solid koji for fermented food products, the improvement wherein at a certain time during a period of about 10 hours to about 20 hours after the inoculation of the koji mold, the cultivation system is subjected to a drying treatment to adjust its water content to about 30±3% and thereafter the cultivation is continued for a total cultivation time of from about 30 to about 100 hours.

2. The process of claim 1 wherein said substrate contains an aliphatic carboxylic acid containing up to 4 carbon atoms or an alkali metal salt thereof.

3. The process of claim 2 wherein said aliphatic carboxylic acid or salt thereof is selected from the group consisting of acetic acid, propionic acid and sodium salts of these.

4. The process of claim 2 or 3 wherein the amount of said aliphatic carboxylic acid or salt thereof is about 0.01 to about 2% by weight based on the weight of the koji substrate.

5. The process of claim 1 wherein said koji substrate contains at least one additive selected from the group consisting of chlorous acid, hypochlorous acid, sulfurous acid, hyposulfurous acid, hydrogensulfurous acid, metabisulfurous acid, hydrogen peroxide and bleaching powder.

6. The process of claim 5 wherein the amount of said additive is about 0.01 to about 2% by weight based on the weight of the koji substrate.

7. The process of claim 1 wherein said drying treatment is carried out using dried air, heated air, or dried and heated air.

8. The process of claim 1 wherein said solid koji is used in the production of a fermented food product which is soy sauce, miso, sake or mirin.

TABLE 5

| Test lot | Control | 1 | 2 | 3 |
|---|---|---|---|---|
| Additive | None | Sodium acetate | Sulfurous acid | Sodium acetate: bleaching powder (1:1) |
| Water content of koji after drying (%) | 40.4 | 33.5 | 34.0 | 33.1 |
| Number of bacteria in koji per gram | 5.6 × 10$^7$ | 2.5 × 10$^1$ | 2.0 × 10$^1$ | 1.0 × 10$^1$ |
| Specific enzyme activity | | | | |
| Protease | 1.0 | 1.5 | 1.3 | 1.4 |
| Amylase | 1.0 | 1.4 | 1.3 | 1.4 |
| Analysis of the components of moromi liquid | | | | |
| Baumé | 19.5 | 20.5 | 20.1 | 20.2 |
| Alc. (%) | 15.3 | 15.0 | 15.1 | 15.0 |
| Amino acids (%) | 0.19 | 0.26 | 0.23 | 0.24 |
| Sugars (%) | 42.5 | 50.3 | 48.8 | 49.5 |
| pH | 5.4 | 5.4 | 5.4 | 5.3 |
| Ratio of utilization of sugars (%) | 78.5 | 82.5 | 81.8 | 82.1 |
| Organoleptic test | | | | |
| Rating | 0 | +1.7 | +1.5 | +1.5 |
| Value | — | ** | ** | ** |